Jan. 28, 1964     W. L. BATCHELOR     3,119,320
AIR DAMPER

Filed April 24, 1961     3 Sheets-Sheet 1

INVENTOR.
WILLIAM L. BATCHELOR
BY Lindsey, Prutzman and Hayes
ATTORNEYS

Jan. 28, 1964 W. L. BATCHELOR 3,119,320
AIR DAMPER
Filed April 24, 1961 3 Sheets-Sheet 3

INVENTOR.
WILLIAM L. BATCHELOR
BY Lindsey, Crutzman and Hayes
ATTORNEYS 3,119,320
AIR DAMPER
William L. Batchelor, Newington, Conn., assignor to Allied Thermal Corporation, New Britain, Conn., a corporation of Connecticut
Filed Apr. 24, 1961, Ser. No. 104,968
9 Claims. (Cl. 98—40)

This invention relates to air distribution apparatus and more particularly to a damper for controlling the flow of air within the apparatus.

It is an object of the present invention to provide a damper which can be utilized for controlling the flow of air in a so-called high capacity installation, and with which the flow of air can be uniformly controlled in one or more directions so as to provide even distribution of air.

It is another object of this invention to provide an improved damper assembly which is particularly suitable for use with an elongated diffuser, such as that used with troffer light fixtures, for providing a uniform distribution of air throughout the entire length of the elongated diffuser without requiring supplementary vanes or a similar expedient.

It is a further object of this invention to provide an improved damper that is capable of controlling the air flow in a plurality of damper outlets and yet operable by a single control and which is simple and reliable in operation and economically constructed.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

Figure 1:
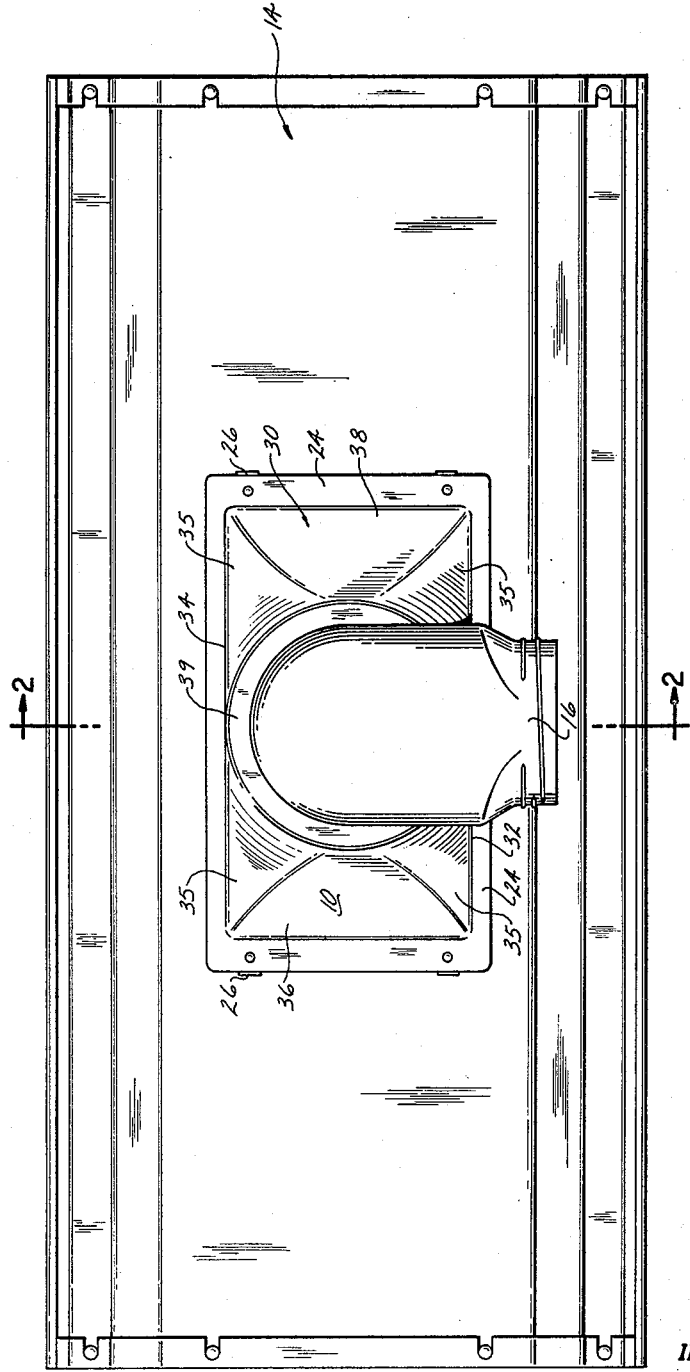
FIG. 1 is a top plan view of a troffer light and diffuser assembly incorporating a damper unit of this invention.
Figure 2:
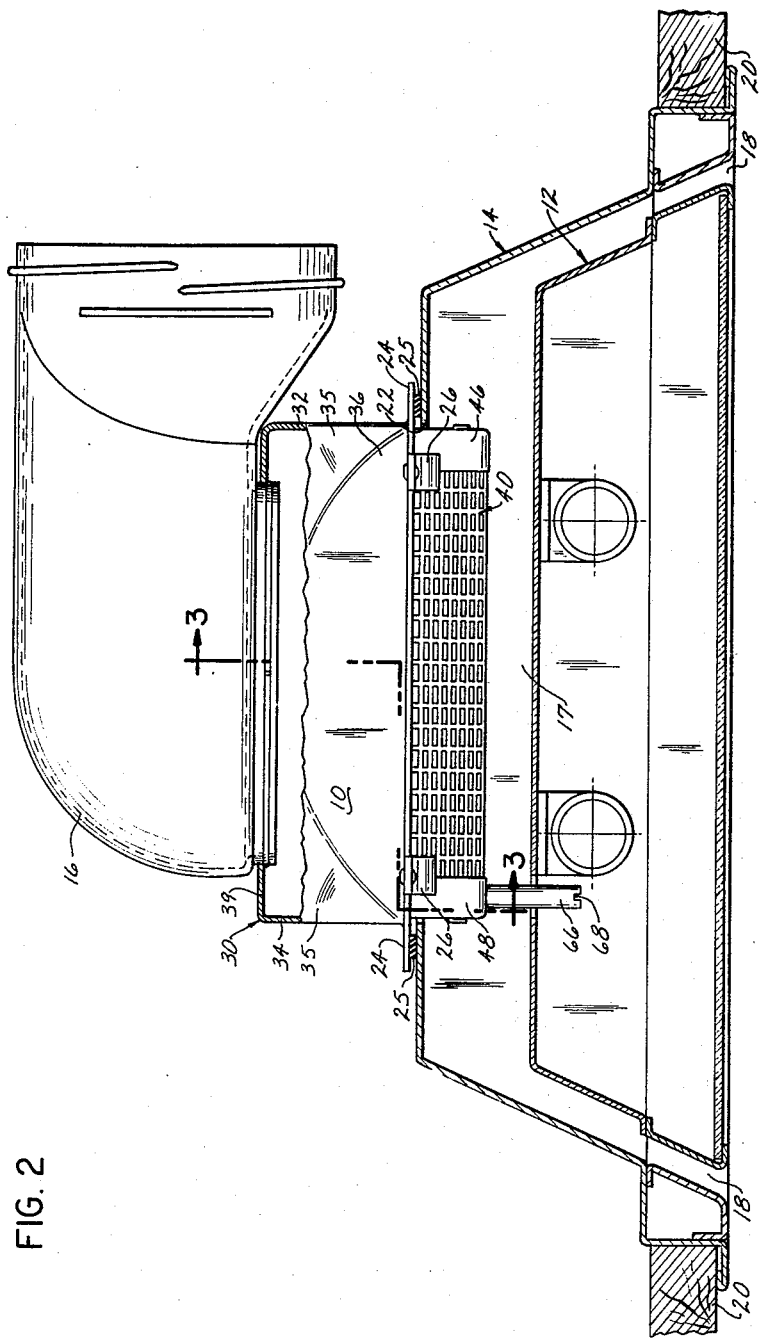
FIG. 2 is an enlarged elevation section view, partly broken away and partly in section, of the troffer light and diffuser assembly of FIG. 1 installed in a ceiling panel, and taken substantially along the line 2—2 of FIG. 1.

Referring to the drawings in detail, the damper unit of this invention generally characterized by the numeral 10, is shown assembled with an elongated troffer light 12, an elongated diffuser housing 14, and a rotatably mounted inlet turret duct 16, such assembly being adapted for convenient installation within an opening in a ceiling panel 20 (FIG. 2). The damper unit 10 is adapted to control the flow of air between an air source (not shown) that is fluidly connected to the turret 16, and an elongated plenum chamber 17 (FIG. 2) from which the air flows to a pair of spaced elongated diffuser outlet passages 18 that are located along the troffer light 12 and which conventionally extend substantially the entire longitudinal length thereof.

The damper unit 10 is centrally located within an opening 22 on the top of the diffuser housing 14, and has a rectangularly shaped peripheral flange 24 and an underlying peripheral seal 25 for supporting the damper unit upon the housing 14 and for preventing the flow of air therebetween. For retaining the damper unit 10 on the housing 14, there are provided a plurality of flexible hooks 26 that are riveted or otherwise secured to the peripheral flange 24 and which are adapted to resiliently engage the edge of the diffuser housing opening 22.

The damper unit 10 is of generally box-shaped construction with a housing 30 having a pair of opposed parallel side walls 32 and 34, a pair of opposed inclined side walls 36 and 38 and four connecting curved wall portions 35, all extending between the integral peripheral flange 24 and an integral apertured top 39 that rotatably supports the turret 16.

Figure 3:
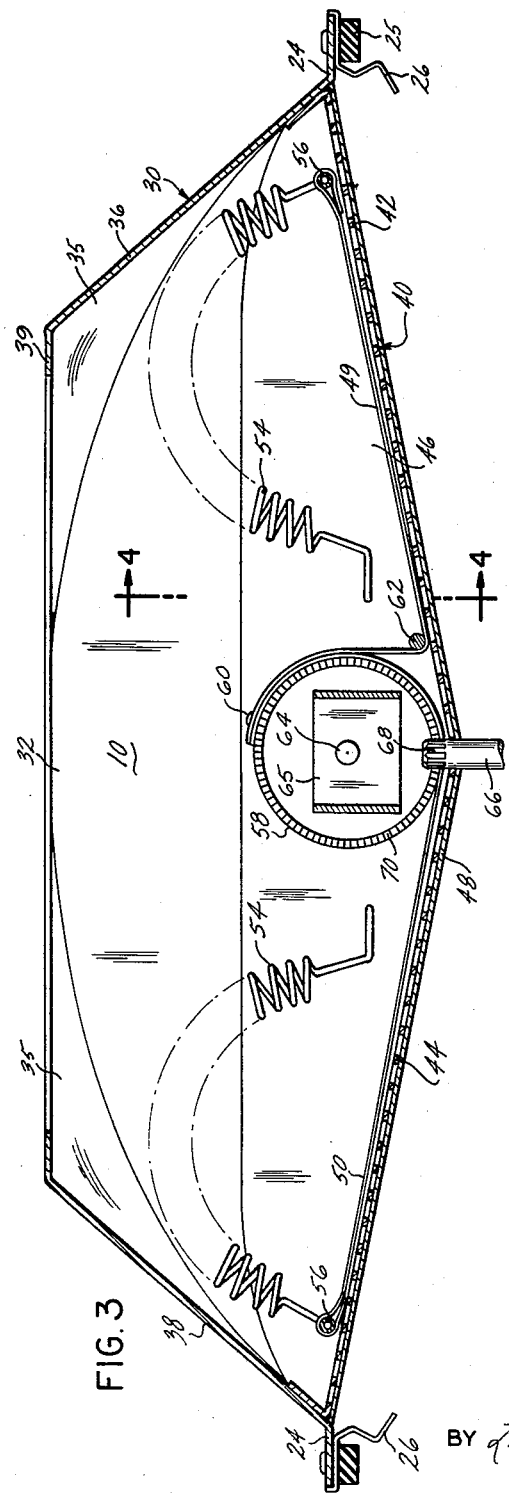
FIG. 3 is an enlarged elevation section view of the damper unit taken substantially along the line 3—3 of FIG. 2.
Figure 4:
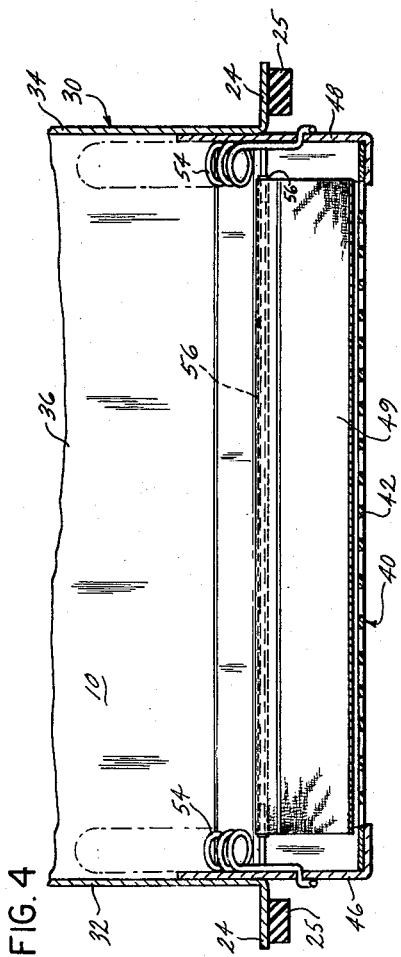
FIG. 4 is a fragmentary section view of the damper unit taken substantially along the line 4—4 of FIG. 3.

Referring now particularly to FIGS. 3 and 4, the housing 30 has a perforated or apertured sheet metal cover plate 40 that extends between the lower edges of the inclined or downwardly diverging side walls 36 and 38 and is retained on the housing 30 by end covers 46 and 48 which are secured as by spot welding to the apertured cover 40 and to the parallel housing side walls 32 and 34. The apertured cover 40 has two cover portions 42 and 44 that are angled downwardly from the diverging side walls 36 and 38, respectively, to a centrally located intersection thereof thereby giving a substantially V-shaped appearance, as viewed in FIG. 3. The damper unit 10 is assembled in the diffuser housing 14 with the cover portions 42 and 44 facing in opposite longitudinal directions so that these cover portions, in conjunction with the diverging side walls, assist in directing the air flow longitudinally outwardly from the damper for evenly distributing the air along the full length of the plenum chamber 17 and thereby providing even flow of air from the elongated diffuser outlet passages 18.

For controlling the volume of air passing through the damper unit 10, there are provided a pair of damper curtains 49 and 50 that overlie the cover portions 42 and 44, respectively, and which limit the damper outlet openings to the uncovered portions of the cover 40 adjacent the diverging side walls 36 and 38. These damper curtains are biased outwardly toward the side walls 36 and 38 by coil springs 54 that have one end fixed within an opening in one of the end covers 46 or 48 (FIG. 4) and the other end fixed within a rod 56 that extends the full width of and is secured to one of the damper curtains 49 or 50. The coil springs 54 tend to straighten out, and, therefore, they hold, in conjunction with the force on the curtains created by the air flow through the damper, the curtains in engagement with the cover 40. The inner ends of the curtains 49 and 50 are fixed as by one or more rivets 60 to a drum or spool 58 having a spool shaft 64 that is rotatably supported by the end cover 46 and by a bracket 65 fixed to the end cover 48 and which has an axis that lies in a plane extending substantially perpendicular to the longitudinal axis of the troffer light 12. The curtain 50 extends tangent to the lower surface of the drum and adjacent to the cover portion 44, whereas a bearing rod 62 is provided to locate the curtain 49 adjacent the cover portion 42.

As the springs 54 bias the damper curtains outwardly from the drum 58, it can be seen that rotation of the drum 58 has the effect, depending on the direction of rotation, of either simultaneously moving the curtains inwardly for increasing the damper outlet openings, or simultaneously moving the curtains outwardly for reducing the damper outlet openings. For operating the drum 58, there is provided a shaft 66 that is rotatably mounted in the end cover 48 and which has teeth 68 on the end thereof meshing with drum teeth 70 for establishing a drive therebetween. Therefore, by merely rotating the shaft 66 as by a screw driver (not shown) inserted within the shaft slot 68, the damper control may be effectuated.

Accordingly, the damper unit of this invention provides a means for controlling air in one or more damper outlets by a simple mechanism which is readily operable and which has a simple construction that may be cheaply manufactured and assembled; and although in most instances it will be desirable to have equal flow in the damper outlets, the damper unit could be provided with damper curtains that would be of such lengths as to give unequal flow from the damper openings. Further, the damper unit of this invention is particularly useful where air is to be directed into an elongated chamber or emitted from an elongated diffuser, as found in a conventional diffuser and troffer light assembly for providing an even distribution of air and thereby reduce the air turbulence in and increase the efficiency of the system.

As will be apparent to persons skilled in the art, various modifications and adaptations of the structure above described will become readily apparent without departure from the spirit and scope of the invention, the scope of which is defined in the appended claims.

I claim:

1. A damper for use in an air distribution system, comprising; a housing having an inlet opening adapted for fluid connection with the air distribution system, an outlet opening and an air passage therebetween, a flexible damper curtain, support means fixed to the housing supporting the damper curtain for rectilinear movement across the air passage to restrict the flow of air therethrough, said curtain being adapted to move in opposite rectilinear directions for increasing or decreasing the air flow in the housing outlet, resilient means connected to one edge of the curtain biasing the curtain in one of said opposite directions to maintain the curtain taut and biasing the curtain against said support means, and manually operable means connected to the curtain and adapted to move it in the other of said opposite directions.

2. A damper for use in an air distribution system, comprising; a housing having an inlet opening adapted for fluid connection with the air distribution system, an outlet opening and an air passage therebetween, a perforated plate fixed to the housing, said perforated plate having two oppositely extending substantially flat perforated plate portions lying across said air passage, two flexible damper curtains overlying the perforated plate portions on the inlet opening side thereof, means mounting said damper curtains for rectilinear movement in opposite directions across the perforated plate portions for increasing or decreasing the air flow in the housing outlet, means biasing the curtains in one of said opposite directions, and manually operable means simultaneously for moving the curtains in the other of said opposite directions.

3. A troffer light and diffuser assembly comprising an elongated troffer light having a light source therein, an elongated diffuser housing disposed about the troffer housing and defining an elongated plenum chamber therewith, a pair of elongated diffuser outlets along the troffer light fluidly connected to the plenum chamber, and an air damper centrally located upon the diffuser housing, said damper comprising a housing having an inlet opening adapted for fluid connection with an air distribution system and an outlet opening in the plenum chamber, a spool rotatably mounted within the housing and centrally located across the housing outlet opening, a pair of flexible damper curtains each having an edge fixed to the spool, means supporting the damper curtains for movement across the housing outlet opening, spring means biasing the opposite edges of the curtains away from the spool and across the outlet opening, said spool having its axis lying in a plane extending substantially perpendicular to the longitudinal axis of the troffer light so that the pair of damper curtains will provide longitudinally spaced air outlets in the plenum chamber, and means for revolving the spool for adjusting the position of the damper curtains and thereby control the air flow through the damper.

4. A troffer light and diffuser assembly comprising an elongated troffer light having a light source therein, an elongated diffuser housing spaced from the troffer light and defining an elongated plenum chamber therewith, an elongated diffuser outlet along the troffer light fluidly connected to the plenum chamber, and a damper unit centrally located within the diffuser housing, said damper unit having a housing with an inlet opening adapted for fluid connection with an air distribution system and an outlet opening in the elongated plenum chamber, said housing having a pair of longitudinally spaced opposed diverging side walls terminating substantially at the outlet opening, a V-shaped perforated sheet metal plate extending between the diverging side walls, a spool rotatably mounted in the damper housing and having its axis lying in a plane extending substantially perpendicular to the longitudinal axis of the troffer light, a pair of flexible damper curtains overlying the V-shaped perforated plate each having one end fixed to the spool, means for revolving the spool, and spring means biasing the damper curtains away from the spool and toward the diverging side walls.

5. A damper for use in an air distribution system, comprising; a housing having an inlet opening adapted for fluid connection with the air distribution system, an outlet opening and sidewalls defining an air passage therebetween, a perforated plate fixed to the housing and extending across said air passage, a flexible damper curtain overlying the plate on the inlet opening side thereof, a spool, means rotatably supporting the spool on the housing for extension between the sidewalls thereof and across the air passage, means securing one edge of the damper curtain to the spool, spring means connected to the opposite edge of the damper curtain biasing the curtain away from the spool and against the perforated plate, and means adapted to revolve the spool whereby the flexible curtain can be positioned to affect the flow of air through the damper.

6. A damper for use in an air distribution system, comprising; a housing having an inlet opening adapted for fluid connection with the air distribution system, an outlet opening and sidewalls defining an air passage therebetween, a spool, means rotatably supporting the spool on the housing for extension between the sidewalls thereof and across the air passage, a pair of flexible damper curtains extending in substantially opposite directions across the air passage, means securing an edge of each of the curtains to the spool, means for urging the opposite edges of the damper curtains away from the spool and across the air passage, and means adapted to rotate the spool whereby the curtains may be simultaneously moved for controlling the air flow through the damper.

7. The damper defined in claim 6 wherein the means for urging the opposite edges of the damper curtains comprises a plurality of coil springs each having one end fixed to the housing and the other end engaging one of said opposite edges of the curtains.

8. A damper for use in an air distribution system, comprising; a housing having an inlet opening adapted for fluid connection with the air distribution system, an outlet opening and sidewalls defining an air passage therebetween, a perforated sheet metal plate fixed to the housing and extending across said air passage, an elongated spool, means rotatably supporting the spool on the housing on the inlet side of the perforated plate for extension between the sidewalls and across said air passage, a pair of oppositely extending flexible damper curtains overlying the perforated plate on the inlet side thereof, means securing the inner edge of the damper curtains to the spool, spring means urging the opposite edges of the damper curtains away from the spool, and means adapted for revolving the spool in either rotational direction.

9. A damper for use in an air distribution system, comprising; a housing having an inlet opening for fluid connection with the air distribution system and an outlet opening, said housing having a pair of opposed diverging sidewalls each having one end thereon terminating substantially at the outlet opening, a V-shaped perforated sheet metal plate extending between the outlet opening ends of the diverging sidewalls and across the outlet opening, a spool, means rotatably supporting the spool on the housing intermediate the diverging sidewalls, a pair of oppositely extending flexible damper curtains overlying the perforated plate, means securing the inner edges of the damper curtains to the spool, spring means biasing the opposite edges of the damper curtains away from the spool toward the diverging sidewalls, and means adapted to revolve the spool in either rotational direction.

References Cited in the file of this patent

UNITED STATES PATENTS

| | | |
|---|---|---|
| 1,138,994 | Steele | May 11, 1915 |
| 2,180,173 | Share | Nov. 14, 1939 |
| 2,349,368 | Myers | May 23, 1944 |
| 2,906,287 | Kreuttner | Sept. 29, 1959 |
| 2,991,708 | Falk | July 11, 1961 |